United States Patent
Lenger

(10) Patent No.: US 8,407,147 B2
(45) Date of Patent: Mar. 26, 2013

(54) GAMING MACHINE

(75) Inventor: Drazen Lenger, Rushcutters Bay (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

(21) Appl. No.: 13/315,878

(22) Filed: Dec. 9, 2011

(65) Prior Publication Data

US 2012/0079472 A1     Mar. 29, 2012

Related U.S. Application Data

(63) Continuation of application No. 12/412,081, filed on Mar. 26, 2009, now abandoned.

(30) Foreign Application Priority Data

Mar. 26, 2008 (AU) .............................. 2008901441

(51) Int. Cl.
   *G06F 21/00*      (2006.01)
   *G06F 9/00*       (2006.01)
   *G06F 9/44*       (2006.01)

(52) U.S. Cl. ............................... 705/51; 713/2; 717/168

(58) Field of Classification Search .................. 705/51; 713/2
See application file for complete search history.

(56) References Cited

U.S. PATENT DOCUMENTS

| | | | |
|---|---|---|---|
| 2002/0025850 A1* | 2/2002 | Hafezi | 463/29 |
| 2002/0169978 A1* | 11/2002 | Kim et al. | 713/200 |
| 2004/0048671 A1 | 3/2004 | Rowe | |
| 2004/0180721 A1 | 9/2004 | Rowe | |
| 2004/0185931 A1* | 9/2004 | Lowell et al. | 463/17 |
| 2004/0254013 A1* | 12/2004 | Quraishi et al. | 463/29 |
| 2005/0138270 A1* | 6/2005 | Morais et al. | 711/102 |
| 2005/0232580 A1 | 10/2005 | Goldberg et al. | |
| 2006/0199645 A1 | 9/2006 | Canterbury et al. | |
| 2006/0253702 A1 | 11/2006 | Lowell et al. | |
| 2006/0287108 A1 | 12/2006 | Canterbury | |
| 2007/0207862 A1 | 9/2007 | Calhoun | |
| 2009/0044003 A1* | 2/2009 | Berthiaume et al. | 713/100 |
| 2009/0172384 A1* | 7/2009 | Anson | 713/2 |
| 2009/0247293 A1 | 10/2009 | Lenger | |

FOREIGN PATENT DOCUMENTS

| | | |
|---|---|---|
| CA | 2504324 | 10/2006 |
| CA | 2548924 | 11/2007 |
| EP | 1770513 A1 | 4/2007 |
| JP | 2006190091 | 7/2006 |
| KR | 20020088058 | 11/2002 |
| KR | 20040106010 | 12/2004 |
| WO | WO 0124012 A1 * | 4/2001 |
| WO | 200215998 | 2/2002 |
| WO | 2007030288 | 3/2007 |
| WO | 2007084680 | 7/2007 |

OTHER PUBLICATIONS

United States Patent and Trademark Office, "Non-Final Office Action," issued in connection with U.S. Appl. No. 12/412,081, mailed Jun. 9, 2011, 19 pages.

* cited by examiner

*Primary Examiner* — Calvin L Hewitt, II
*Assistant Examiner* — Zeshan Qayyum
(74) *Attorney, Agent, or Firm* — Hanley, Flight & Zimmerman, LLC

(57) ABSTRACT

A method of conducting a software update of a gaming machine, including: starting a boot process of the gaming machine; determining during the boot process that a memory device potentially containing at least one software component more recent than a corresponding software component currently stored in gaming machine memory is in data communication with the gaming machine; determining that the memory device contains at least one authentic, more recent software component; and updating gaming machine memory with each more recent software component.

20 Claims, 3 Drawing Sheets

GAMING MACHINE

CROSS-REFERENCE TO RELATED APPLICATIONS

This patent arises from a continuation of U.S. patent application Ser. No. 12/412,081, filed Mar. 26, 2009, entitled "A GAMING MACHINE," which claims the benefit of priority to Australian Provisional Patent Application No. 2008901441, filed on Mar. 26, 2008, entitled "A GAMING MACHINE", which is herein incorporated by reference in its entirety.

FIELD

The present invention relates to a gaming machine and a method of conducting a software update of a gaming machine.

BACKGROUND

Program code to be run on gaming machines sometimes needs to be updated to address problems with existing code or to add a capability. Given the nature of gambling regulations, there is a need for a high degree of confidence in the security of an electronic gaming machines. Accordingly, current software updates are performed by physically swapping memory components of a gaming machine. There is a need for alternative techniques for updating software which provides and a high degree of security.

SUMMARY

In a first aspect, the invention provides a method of conducting a software update of a gaming machine, including:
   starting a boot process of the gaming machine;
   determining during the boot process that a memory device potentially containing at least one software component more recent than a corresponding software component currently stored in gaming machine memory is in data communication with the gaming machine;
   determining that the memory device contains at least one authentic, more recent software component; and
   updating gaming machine memory with each more recent software component.

In an embodiment, updating the gaming machine includes replacing each corresponding software component with each more recent software component.

In an embodiment, determining that the memory device contains at least one authentic software component which is more recent than a corresponding software component currently stored in a memory of the gaming machine includes:
   authenticating each software component stored on the memory device; and
   determining that a version number of each authenticated software component stored on the memory device is indicative of a more recent version of the software component than a corresponding software component stored in the memory of the gaming machine.

In an embodiment, authenticating each software component stored on the memory device by using a public key stored at the gaming machine to verify that the software component has been signed with the corresponding public key.

In an embodiment, the method includes determining that the version number is more recent if it is higher than a version of the corresponding software component.

In an embodiment, the method includes determining that a main door of the gaming machine is open prior to updating each more recent authentic software component.

In an embodiment, the method includes determining that a logic door of the gaming machine is open prior to updating each more recent authentic software component.

In an embodiment, the method includes restarting the boot process subsequent to completion of the update.

In an embodiment, the method includes continuing the boot process subsequent to completion of the update.

In an embodiment, the method includes determining that the memory device is connected to a USB port of the gaming machine.

In an embodiment, conduct of the boot process is caused by a processor of the gaming machine executing instruction stored in gaming machine memory.

In a second aspect, the invention provides a gaming machine including:
   a processor;
   gaming machine memory storing updateable software components and storing instructions to cause the processor to conduct a boot process, the gaming machine arranged to:
   determine during the boot process that a memory device potentially containing at least one software component more recent than a corresponding software component currently stored in gaming machine memory is in data communication with the gaming machine;
   determine that the memory device contains at least one authentic, more recent software component; and
   conduct an update process of gaming machine memory in respect of each more recent software component.

In an embodiment, the gaming machine includes at least one USB port, the gaming machine arranged to determine that a memory device in the form of a USB compatible drive is connected to the USB port.

In an embodiment, the gaming machine includes a main door and arranged to determine that the main door is open prior to updating each more recent authentic software component.

In an embodiment, the gaming machine includes a logic door and arranged to determine that the logic door is open prior to updating each more recent authentic software component.

In an embodiment, the gaming machine is arranged to only mount the USB drive for the duration of the boot process.

In an embodiment, the gaming machine is arranged to update the gaming machine by replacing each corresponding software component with each more recent software component.

In an embodiment, the gaming machine is arranged to determine that the memory device contains at least one authentic software component which is more recent than a corresponding software component currently stored in a memory of the gaming machine by:
   authenticating each software component stored on the memory device; and
   determining that a version number of each authenticated software component stored on the memory device is indicative of a more recent version of the software component than a corresponding software component stored in the memory of the gaming machine.

In an embodiment, the gaming machine is arranged to authenticate each software component stored on the memory device by using a public key stored at the gaming machine to verify that the software component has been signed with the corresponding public key.

In an embodiment, the gaming machine is arranged to determine that the version number is more recent if it is higher than a version of the corresponding software component.

DESCRIPTION OF DRAWINGS

Exemplary embodiments of the invention will now be described in relation to the following drawings in which.

Figure 1:
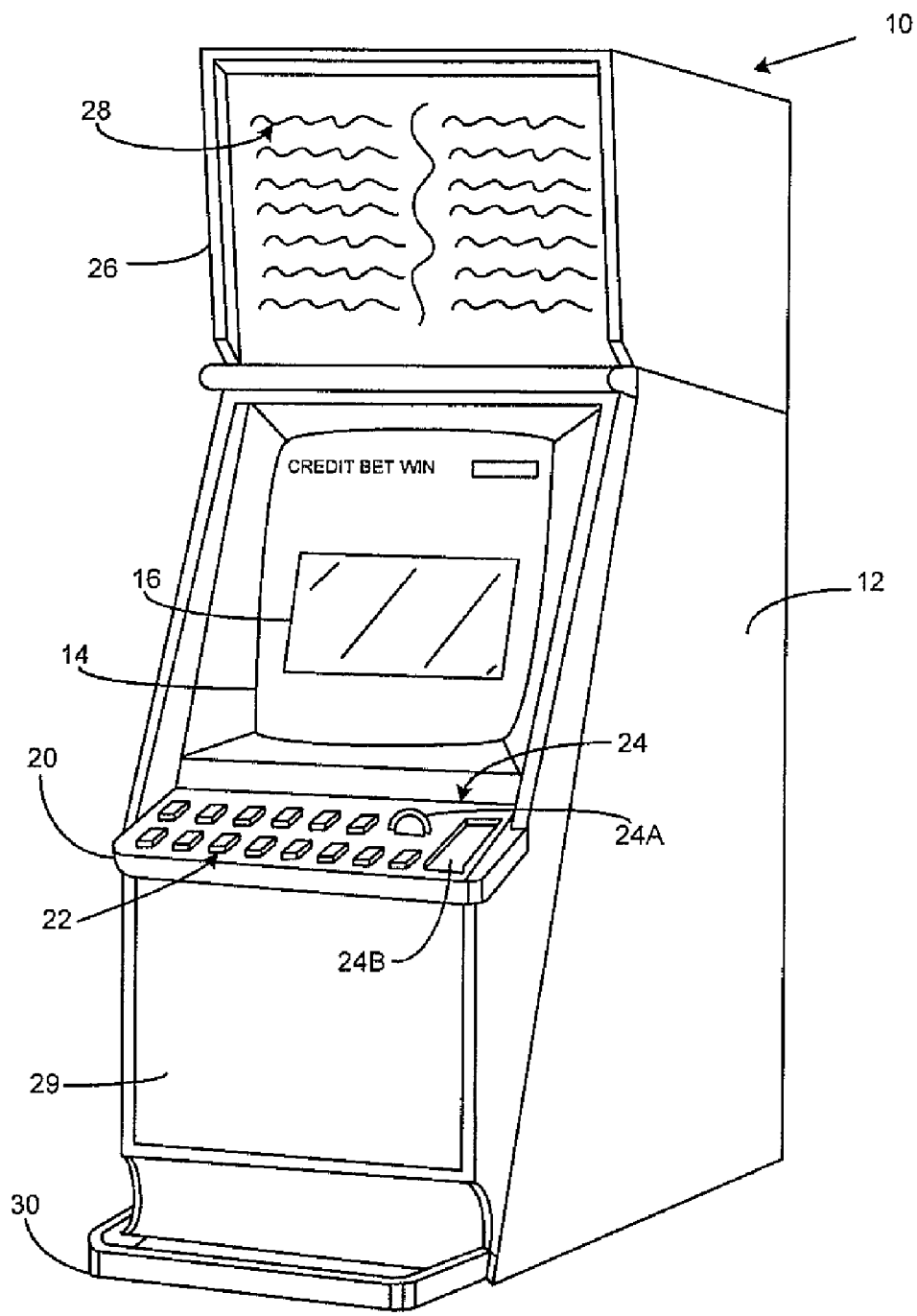
FIG. 1 is a perspective view of a gaming machine.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION

Referring to the drawings, there is shown an embodiment of an electronic gaming machine arranged to implement a software update process.

A gaming machine 10 is illustrated in FIG. 1. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 2:
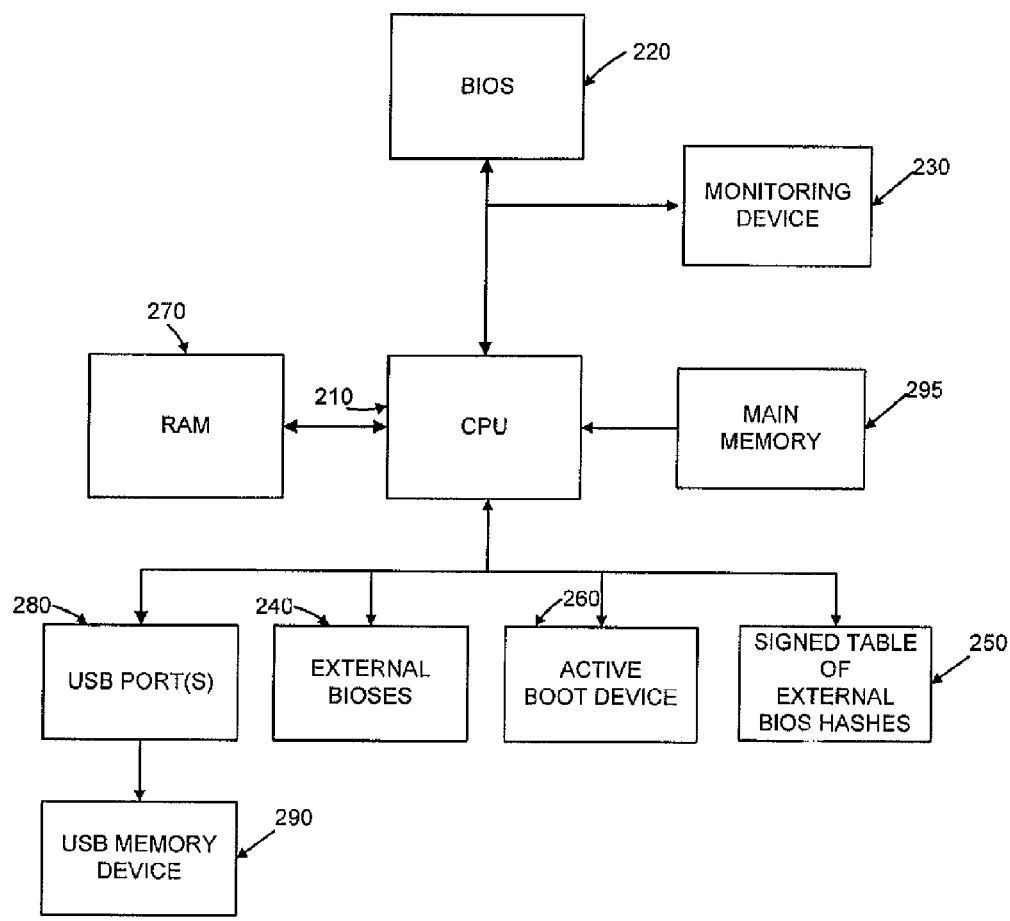
FIG. 2 is a schematic diagram of the main components of the gaming machine of a first embodiment that relate to implementation of a boot process featuring software update.

FIG. 2 illustrates one embodiment of a boot process which is described in more detail in Australian patent application 2007203243, the disclosure of which is incorporated herein by reference. The electronic gaming machine has a central processing unit (CPU) 210. Boot program code is stored in BIOS 220. Logically the boot program code consists of a BIOS loader, a boot-loader and a BIOS-control-program.

The different portion of code contains components for different security features. Specifically: BIOS loader contains an RSA master public key; and the BIOS control program contains an RSA signature of the BIOS control program SHA 1 hash that is signed by the RSA master private key corresponding to the RSA master public key.

When the electronic gaming machine is reset such that a boot process is started, the CPU (processor) 210 of electronic gaming machine begins executing the first instruction of the BIOS loader stored in the BIOS 220. The monitoring device 230 snoops every read access to the BIOS loader to thereby monitor reading of the BIOS loader by the CPU 210. The monitoring device is implemented by a field programmable gate array and contains a duplicate copy of the BIOS loader monitors access to the BIOS 220 that provides validation code that can be used to determine that the BIOS loader is valid. The monitoring device verifies that the BIOS loader read out by the CPU matches the validation copy of the BIOS loader stored in the monitoring device. If it does not match, the monitoring device halts operation in such a manner that this will ultimately cause the electronic gaming machine to fail booting. This ensures that the electronic gaming machine is running a valid, unmodified copy of the BIOS loader and hence that the code to check the validity of the BIOS control program (as described in further detail below) is still present and will be executed by CPU 210.

The BIOS loader calculates a hash of the BIOS control program and copies the BIOS control program to RAM. The BIOS loader then retrieves a RSA signature from the BIOS-control-program and retrieves the RSA master public key from the BIOS loader. The BIOS loader decrypts the signature of the BIOS-control-program hash and determines whether the hashes match. If the hashes fail to match booting is failed. Otherwise the verification is successful and execution is transferred to the BIOS-control-program now stored in RAM. The BIOS-control-program then seeks to verify any external BIOSes 240 by reference to a signed table of external BIOS hashes 250. The CPU 220 calculates a hash of each external BIOS 360. It decrypts the signed table of external BIOS hashes 250 using RSA and the RSA master public key contained in the boot-loader. Each external BIOS 240 is hashed and compared to the now decrypted stored hash 365. Any external BIOSES not matched are ignored. Otherwise control is transferred to the external BIOSes.

These steps ensure the electronic gaming machine is running a BIOS control program that has been signed by a master private key.

Before the BIOS-control-program transfers control to the master boot record of the active boot partition on the active boot device 260 it verifies the active boot partition and boot cylinder by calculating a hash of the active boot partition and the hash of the boot cylinder and verifying the hash against the RSA signature stored on the active boot device using the RSA master key and RSA. If they do not match the boot is failed.

The active boot partition includes a number of different partitions including a game partition, a platform partition and an operating system partition, each of which are verified independently. The operating system may be Linux.

If the verification is successful, the process proceeds to load the master boot record which in turn loads the boot loader in the boot cylinder. The boot loader verifies the contents of the game, platform and operating system partition using the RSA public keys stored in the boot loader against the RSA signatures stored in files in each of the partitions. If the verification is successful, the process proceeds to load and execute the operating system. These steps ensure the electronic gaming machine is running an operating system and system software that had previously signed by the RSA master key. The operating system then loads the platform software from main memory 220 being software components specific to the hardware on which the operating system is running and the game is expected to run. Once the platform is established, the game software is loaded.

Figure 3:
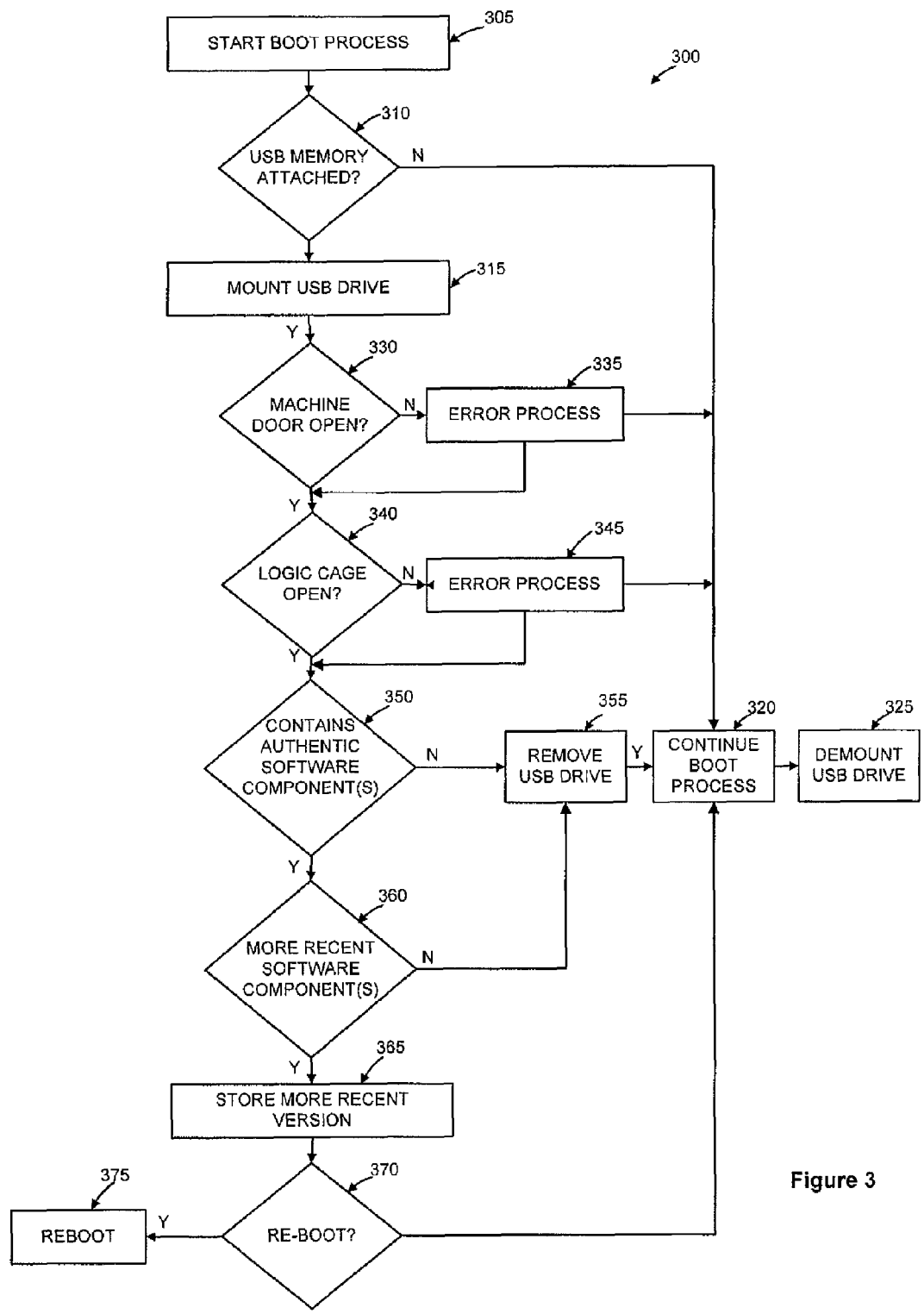
FIG. 3 is a flow chart of the software update process.

As described in FIG. 3, at an appropriate point after the boot process is started 305 an update process is started. In this embodiment, early in the process of the operating system loading the platform software, the update process 300 involves checking 310 whether a USB memory device 290 is attached to the USB port 280 and mounting any such USB drive 315. If no memory device 290 is attached, the boot process is continued 320.

In this embodiment, if a memory device 290 is attached a number of additional checks are made before any code can be stored to a memory of the gaming device. These checks have the advantage of increasing the likelihood that the software update is legitimate and not an attempt to illegitimately access the gaming machine. In this respect, the memory to which the code is ultimately stored will vary depending on the specific embodiment and the type of code being updated, for example, it could be used to update code in BIOS 220 or main memory 295 (which may be compact flash, for example). Herein, "gaming machine memory" is used to refer to memory normally resident within the gaming machine including the BIOS 220 and main memory 295.

In this embodiment, it is assumed that the memory device 290 is to be manually attached to a USB port 280 of the gaming machine. In other embodiments, a memory device may be placed in data communication with the gaming machine in some other manner, for example, the gaming machine may have a network card and be configured to check for a memory device at a particular network address during the update process.

The first check 330 is that the main door of the gaming machine 10 is open. If it is not open, an error process 335 is initiated which can be resolved by removing the USB memory device (the USB port may be externally accessible) in which case the boot process continues 320.

The second check 340 is that the door of the logic cage is open. (The logic cage contains the main board of the gaming machine.) Again an error process can be resolved in by removing the USB memory device 290 (the USB port may externally accessible of the logic cage when the main door is open) in which case the boot process continues 320. The first and second checks are designed to ensure that the person attaching the USB drive is a technician authorised to access the logic cage and has done so in the correct manner.

The third check 350 is to determine whether the memory device contains any "authentic" software components, e.g. which pass a digitally signed authentication test which demonstrates that they have been signed by a private key corresponding, for example to the RSA master public key stored in the boot-loader. If there are no authentic software components, a message is displayed to ask the technician to remove the USB drive 355 so that the boot process can continue 320. If there are one or more authentic software components, the process proceeds to the fourth check 360.

The fourth check 360 involves checking whether any of the authentic software components is more recent than the current version of the software component stored in a memory of the gaming machine. In this embodiment, code is more recent if it has a higher version number. If there are no more recent components, a message is displayed to ask the technician to remove the USB drive 355 so that the boot process can continue 320. If there are one or more authentic and more recent software components the process proceeds to storing 365 the more recent components, typically by overwriting the previous version but the previous version may be kept, for example, by renaming it to allow a restore. It is then determined 370 whether a re-boot is necessary based on the nature of the upgraded code and either the gaming machine is re-booted 375 or the boot process continues 320. After any re-boot, the method involves performing a manual RAM reset. If a reboot is not necessary, the boot process continues 320 and the USB drive is demounted 325. Advantageously, this protects against the possibility that a person will attempt to illegitimately access the gaming machine via the USB port while it is running. That is, USB drives will only be mounted during the boot process.

The program code may include different code elements, depending on the particular implementation and what it is desired to update, for example it may contain the most up to date boot loader code, the most up to date code for the boot partition, the most up to date system code, and or the most up to date game code for the gaming machine. Indeed, it may include some or all of the above such that irrespective of the current state of code of the gaming machine, it is brought completely up to date by virtue of the update process 300.

Persons skilled in the art will appreciate that there may be variations on the above boot and update processes. For example, while the above embodiment employs SHA-1 hashes and RSA signatures, other cryptographic hashes and signatures maybe employed. For example, SHA-1 HMAC or DSA or a mixture of techniques. There may also be some additional steps carried out before software is executed. For example, the signature of system and game software components may be checked by checking the entire disk partitions, directories or individual files. Such checks may be performed on demand, that is immediately prior to a component being loaded or in advance, that is prior to any components being accessed. Further in some instances it may be appropriate to check components with multiple signatures. This allows the loading of a component to be prevented if it has not be signed by all required parties which may include the manufacture of the gaming machine, a regulatory body or a third party developer.

Further, certificates rooted in the master public key may be stored with the software components rather than public keys. These and other variations will be apparent to persons skilled in the art and should be considered as falling within the invention described herein. It will also be appreciated that other embodiments of the invention can be formed from the features described above.

In the claims which follow and in the preceding description of certain embodiments of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A method of conducting a software update of a gaming machine, comprising:
   starting a boot process of the gaming machine, wherein a central processing unit (CPU) initiates reading of a basic input/output system (BIOS) loader stored in a BIOS;
   monitoring reading of the BIOS loader via a monitoring device, wherein the monitoring device contains a duplicate copy of the BIOS loader;
   reading, by the CPU, the BIOS loader and validating, by the CPU, that the BIOS loader read by the CPU matches the duplicate copy of the BIOS loader contained within the monitoring device;
   determining, by the BIOS loader, during the boot process that a memory device is in data communication with the gaming machine;
   determining, by the BIOS loader, that the memory device in data communication with the gaming machine contains at least one authentic second software component more recent than a corresponding first software component currently stored in gaming machine memory; and
   updating by the BIOS loader, gaming machine memory with each of the at least one authentic second software component that is more recent than the corresponding first software component.

2. A method as claimed in claim 1, wherein updating the gaming machine comprises replacing each corresponding software component with each of the at least one authentic second software component that is more recent than the corresponding first software component.

3. A method as claimed in claim 1, wherein determining that the memory device contains at least one authentic second software component which is more recent than a corresponding first software component currently stored in a memory of the gaming machine comprises:
   authenticating each software component stored on the memory device; and
   determining that a version number of each authenticated software component stored on the memory device is indicative of a more recent version of the software component than a corresponding first software component stored in the memory of the gaming machine.

4. A method as claimed in claim 3, comprising authenticating each software component stored on the memory device by using a public key stored at the gaming machine to verify that the software component has been signed with the corresponding public key.

5. A method as claimed in claim 4, comprising determining that the version number is more recent if it is higher than a version of the corresponding software component.

6. A method as claimed in claim 1 comprising determining that a main door of the gaming machine is open prior to updating with each of the least one authentic second software component that is more recent than the corresponding first software component.

7. A method as claimed in claim 1 comprising determining that a logic door of the gaming machine is open prior to updating with each of the least one authentic second software component that is more recent than the corresponding first software component.

8. A method as claimed in claim 1 comprising restarting the boot process subsequent to completion of the update.

9. A method as claimed in claim 1 comprising continuing the boot process subsequent to completion of the update.

10. A method as claimed in claim 1 comprising determining that the memory device is connected to a USB port of the gaming machine.

11. A method as claimed in claim 1, wherein the conduct of the boot process is caused by a processor of the gaming machine executing instructions stored in gaming machine memory.

12. A gaming machine comprising:
   a processor;
   gaming machine memory storing updateable software components and storing instructions which, when executed by the processor, cause the processor to perform:
   monitoring a reading of a BIOS loader via a monitoring device, wherein the monitoring device contains a duplicate copy of the BIOS loader;
   reading, by the CPU, the BIOS loader and validating, by the CPU, that the BIOS loader read by the processor matches the duplicate copy of the BIOS loader contained within the monitoring device;
   determining, by the BIOS loader, during the boot process that a memory device is in data communication with the gaming machine;
   determining, by the BIOS loader, that the memory device in data communication with the gaming machine contains at least one authentic second software component more recent than a corresponding first software component currently stored in gaming machine memory; and
   updating by the BIOS loader the gaming machine memory in respect of each of the at least one authentic second software component that is more recent than the corresponding first software component.

13. A gaming machine as claimed in claim 12 comprising at least one USB port, the gaming machine arranged to determine that a memory device in the form of a USB compatible drive is connected to the USB port.

14. A gaming machine as claimed in claim 12, comprising a main door and arranged to determine that the main door is open prior to updating each more recent authentic software component.

15. A gaming machine as claimed in claim 12 comprising a logic door and arranged to determine that the logic door is open prior to updating with each of the least one authentic second software component that is more recent than the corresponding first software component.

16. A gaming machine as claimed in claim 13, arranged to only mount the USB drive for the duration of the boot process.

17. A gaming machine as claimed in claim 12, arranged to update the gaming machine by replacing each corresponding software component with each more recent software component.

18. A gaming machine as claimed in claim 12, arranged to determine that the memory device contains at least one authentic second software component which is more recent than a corresponding first software component currently stored in a memory of the gaming machine by:
   authenticating each software component stored on the memory device; and
   determining that a version number of each authenticated second software component stored on the memory device is indicative of a more recent version of the software component than a corresponding first software component stored in the memory of the gaming machine.

19. A gaming machine as claimed in claim 18, arranged to authenticate each software component stored on the memory device by using a public key stored at the gaming machine to verify that the software component has been signed with the corresponding public key.

20. A gaming machine as claimed in claim 18, arranged to determine that the version number is more recent if it is higher than a version of the corresponding software component.

* * * * *